(12) United States Patent
Hebiguchi

(10) Patent No.: US 6,249,326 B1
(45) Date of Patent: *Jun. 19, 2001

(54) ACTIVE MATRIX TYPE LCD IN WHICH A PIXEL ELECTRODES WIDTH ALONG A SCANNING LINE IS THREE TIMES ITS DATA LINE SIDE WIDTH

(75) Inventor: Hiroyuki Hebiguchi, Miyagi-ken (JP)

(73) Assignees: LG Philips LCD Co., Ltd., Seoul (KR); Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,461

(22) Filed: Dec. 4, 1998

(30) Foreign Application Priority Data

Dec. 5, 1997 (JP) .................................... 9-336118

(51) Int. Cl.[7] ............................. G02F 1/136; G02F 1/1343
(52) U.S. Cl. ............................................. 349/42; 349/139
(58) Field of Search .................................. 349/38, 42, 106, 349/139

(56) References Cited

U.S. PATENT DOCUMENTS

| 5,295,008 | 3/1994 | Mizobata et al. . |
| 5,614,290 | * 3/1997 | Yamaguchi ........................ 349/106 |
| 5,844,641 | * 12/1998 | Jun et al. ............................ 349/38 |
| 5,946,058 | * 8/1999 | Kamada et al. ..................... 349/38 |

* cited by examiner

Primary Examiner—Walter J. Malinowski
(74) Attorney, Agent, or Firm—Brinks Hofer Gilson & Lione

(57) ABSTRACT

An active matrix type liquid crystal display which has storage capacitance cells formed on scanning lines, and which is designed to increase the aperture ratio. The pitch between each of adjacent pair of signal lines on a thin-film transistor array substrate is increased relative to the pitch between each of adjacent pair of scanning lines to form an oblong dot, different from those in displays constructed in the conventional manner. A portion of a pixel electrode is extended over a portion of the preceding-stage scanning line. The portions of the pixel electrode and the scanning line form a storage capacitance cell. Even if the display is designed so that the capacitance value of the storage capacitance cell is equal to that in the conventional displays, the light stop area can be reduced relative to that in the conventional displays, thereby increasing the aperture ratio.

20 Claims, 12 Drawing Sheets

FIG. 10

| SCANNING LINE NO. \ SIGNAL LINE NO. | 1 | 2 | 3 |
|---|---|---|---|
| 1 | R | R | R |
| 2 | G | G | G |
| 3 | B | B | B |
| 4 | R | R | R |
| 5 | G | G | G |
| 6 | B | B | B |
| 7 | R | R | R |
| 8 | G | G | G |
| 9 | B | B | B |

FIG. 11

| SCANNING LINE NO. \ SIGNAL LINE NO. | 1 | 2 | 3 |
|---|---|---|---|
| 1 | R | B | G |
| 2 | G | R | B |
| 3 | B | G | R |
| 4 | R | B | G |
| 5 | G | R | B |
| 6 | B | G | R |
| 7 | R | B | G |
| 8 | G | R | B |
| 9 | B | G | R |

ACTIVE MATRIX TYPE LCD IN WHICH A PIXEL ELECTRODES WIDTH ALONG A SCANNING LINE IS THREE TIMES ITS DATA LINE SIDE WIDTH

BACKGROUND OF THE INVENTION

1. Field of the Invention

The present invention relates to an active matrix type liquid crystal display which has storage capacitance cells formed on scanning lines, and which displays one color by combining a plurality of fundamental colors, e.g., red, green and blue if it is a multicolor display.

2. Description of the Related Art

An active matrix type liquid crystal display has a pair of substrates between which a liquid crystal is maintained, a plurality of scanning lines and a plurality of signal lines arranged so as to form a matrix, a switching device such as a thin-film transistor (TFT) provided in each of regions defined between the scanning lines and the signal lines, and a pixel electrode connected to each switching transistor.

FIG. 14 shows arrangement of components constructed on one of regions defined between scanning and signal lines on one of a pair of substrates for an active matrix type liquid crystal display, i.e., a thin-film transistor array substrate. Conductors which extend laterally as viewed in FIG. 14 are scanning lines $G_1$ and G2 while conductors which extend vertically are signal lines $S_1$ and $S_2$. A semiconductor active film 1 is formed on the scanning line $G_1$ with a gate insulating film interposed therebetween. A source electrode 2 extending from the signal line $S_1$ and a drain electrode 3 are formed on the semiconductor active film 1. The scanning line $G_1$, the source electrode 2, the drain electrode 3 constitute an inverted staggered thin-film transistor T. A pixel electrode 4 is formed on a passivation film which covers the source electrode 2 and the drain electrode 3. The pixel electrode 4 which is formed over the region defined between the scanning lines $G_1$ and $G_2$ and between the signal lines $S_1$ and $S_2$ has an extension formed over a portion of the preceding-stage scanning line $G_2$ for driving the adjacent pixel electrode 4. The pixel electrode 4 over this region is electrically connected to the drain electrode 3 via a contact hole 5, and forms a storage capacitance cell $C_0$ in association with the scanning line $G_2$ through the gate insulating film and the passivation film.

On the other substrate opposed to the thin-film transistor array substrate are provided a common electrode and a black matrix for stopping light at regions where the thin-film transistor T, the scanning lines $G_1$ and $G_2$, the signal lines $S_1$ and $S_2$ are provided. The black matrix has a rectangular aperture 6 indicated by the dot-dash line in FIG. 14. Light can pass through the aperture 6. The aperture 6 corresponds to an effective display area which contributes essentially to display.

If the liquid crystal display is a monochromatic display, each region defined between the scanning lines $G_1$ and $G_2$ and the signal lines $S_1$ and $S_2$ corresponds to one pixel. If the liquid crystal display is a multicolor display, a color filter having different fundamental colors, e.g., red, green and blue is provided on the opposed substrate, each color corresponding to one of the regions defined between the scanning lines $G_1$ and $G_2$ and the signal lines $S_1$ and $S_2$. One region corresponds to one dot, and a set of three dots is formed as one pixel.

It is necessary for the above-described conventional liquid crystal display to be designed so that all peripheral portions of each pixel electrode 4 overlap the black matrix. This is because there is a possibility of a disturbance of the orientation of liquid crystal molecules due to a disturbance of the electric field caused by interference with the electric fields formed by the adjacent pixel electrodes, resulting in occurrence of a leak of light at the peripheral portions of the pixel electrode 4. It is necessary to stop such a leak of light by the black matrix. The width W of each of the overlap portions is a value determined as the sum of a width necessary and sufficient for stopping a light leak and an overlap margin selected by considering the accuracy of superposition of the thin-film transistor array substrate and the opposed substrate. On the other hand, the area of the overlap portions is a factor of restriction the aperture ratio, and there is a need to minimize the area of the overlap portions in order to increase the aperture ratio.

In the case where the pixel electrode 4 is formed so as to extend over a portion of the scanning line $G_2$ to form a storage capacitance cell $C_0$ on the scanning line $G_2$ as shown in FIG. 14, the scanning line $G_2$ functions as a black matrix portion because of the overlap of the pixel electrode 4 and the scanning line $G_2$. In other words, the aperture ratio is not changed by an extension of the aperture 6 of the black matrix on the scanning line $G_2$ side, and the effective aperture ratio is determined by the size of the portions of the pixel electrode 4 and the scanning line $G_2$ superposed on each other. If the area of the portion of the pixel electrode 4 where light is stopped by the portion of the black matrix superposed on the pixel electrode portion is S; the width of the aperture along the scanning line direction (the distance between edges of the black matrix) is x; and the width of the aperture along the signal line direction (the distance between an edge of the black matrix and the scanning line) is y, the light stop area S is roughly expressed by the following equation:

$$S = W \times (x + 2y) \tag{1}$$

Thus, the influence of the width y along the signal line direction is twice as large as that of the width x along the scanning line direction. That is, an increase in S when y is increased by a certain amount is larger than an increase in S when x is increased by the same amount.

In conventional liquid crystal displays, however, the pitch between adjacent signal lines and the pitch between adjacent scanning lines are such that, if the former pitch is X and the latter is Y, Y is generally about thrice X, for example, X=100 $\mu$m and Y=300 $\mu$m. Naturally x<y, since X<Y (3X=Y). The increase in the light stop area by an increase in the width y of the aperture along the signal line direction is larger, so that the increase in the aperture ratio is limited.

SUMMARY OF THE INVENTION

In view of the above-described problem, an object of the present invention to provide, as an active matrix type liquid crystal display having storage capacitance cells formed on scanning lines, a display which can be designed so as to have an aperture ratio higher than that of the conventional displays.

To achieve the above-described object, according to one aspect of the present invention, there is provided an active matrix type liquid crystal display including a matrix-like array of a plurality of scanning lines and a plurality of signal lines arranged on a surface of one of a pair of substrates between which a liquid crystal is interposed, and a switching element and a pixel electrode provided in each of regions surrounded by the signal lines and the scanning lines, the switching element being connected to one of the scanning lines and one of the signal lines, the pixel electrode being connected to the switching element, wherein the width of the pixel electrode in the direction along the scanning lines is larger than the width of the pixel electrode in the direction along the signal lines, and the pixel electrode extends over a portion of the scanning line for driving one of the adjacent pixel electrodes, the pixel electrode forming a storage capacitance cell in association with the scanning line with an insulating film interposed between the pixel electrode and the scanning line.

As the above-described switching element, a thin-film transistor, a thin-film diode or the like may be used.

As described above, in the conventional liquid crystal display, the relationship between the pitch X between adjacent signal lines and the pitch Y between adjacent scanning lines is X<Y, and the relationship between the width x of the aperture along the scanning line direction in each of the regions surrounded by the scanning lines and the signal lines and the width y of the aperture along the signal line direction is x<y. Therefore, as is apparent from equation (1), the influence of a change in the width y along the signal line direction upon a change in the light stop area is larger than the corresponding change in the width x along the scanning line direction. The light stop area is large because of the disadvantageous condition x<y. The improvement in aperture ratio is thereby limited.

In contrast, in the liquid crystal display of the present invention, the width of the pixel electrode along the scanning line direction is larger than the width along the signal line direction. That is, the relationship between the width x of the aperture along the scanning direction and the width y along the signal line direction is x>y, which is reverse to that in the conventional display. Also, a portion of the pixel electrode extending over a portion of the scanning line for driving one adjacent pixel electrode forms a storage capacitance cell in association with this scanning line. This storage capacitance cell functions to maintain charge on the pixel electrode. Therefore, even if the display is designed so that the capacitance value of the storage capacitance cell is the same as that in the conventional structure, the light stop area can be reduced relative to that in the conventional display to increase the aperture ratio.

If the same aperture ratio as that in the conventional display suffices, the overlap portions of the pixel electrodes and the scanning lines can be increased in comparison with those in the conventional display to increase the storage capacitance value, thereby reducing flicker and crosstalk due to off current in the switching elements.

Further, the capacitive coupling between the opposed electrode provided on the other substrate opposed to the above-described substrate and the scanning lines becomes stronger while the capacitive coupling between the opposed electrode and the signal lines becomes weaker. Therefore, crosstalk due to variation in the potential of the opposed electrode can be reduced.

A structure in which a conductor layer connected to the pixel electrode is formed over a portion of the scanning line for driving the adjacent pixel electrode, and in which this conductor layer and the scanning line form a storage capacitance cell may be used instead of the structure in which a portion of the pixel electrode is extended over a portion of the scanning line to form a storage capacitance cell in association with the scanning line.

In a case where an inverted staggered thin-film transistor is used as a switching element, a gate insulating film, a semiconductor active film for forming a channel region, a source electrode and a drain electrode are formed on the scanning line to form the thin-film transistor, and an interlayer insulating film and the pixel electrode are formed thereon. Ordinarily, a material having a large dielectric constant is used to form the gate insulating film for the purpose of reducing the on resistance of the thin-film transistor, and the thickness the film is small.

In the case where the pixel electrode and the scanning line form a storage capacitance cell, two films, i.e., the gate insulating film and the interlayer insulating film exist as the capacitor insulating films interposed between the pixel electrode and the scanning line. On the other hand, in the case where the conductor layer and the scanning line form a storage capacitance cell, only the gate insulating film exists as a capacitor insulating film interposed between the conductor layer and the scanning line. Since as mentioned above the gate insulating film has a large dielectric constant and is small in thickness, forming a storage capacitance cell by using the conductor layer and the scanning line is more advantageous than forming a storage capacitance cell by using the pixel electrode and the scanning line. In the case of forming a storage capacitance cell by using the conductor layer and the scanning line, the area of the storage capacitance cell for obtaining the necessary capacitance value is smaller. In this case, therefore, the aperture ratio can be increased.

If the conductor layer is formed of as a layer corresponding to the source electrode and the drain electrode, a storage capacitance cell can be obtained without specially increasing the number of layers.

More specifically, the liquid crystal display of the present invention may be arranged that an interlayer insulating film is interposed between the pixel electrode and the conductor layer corresponding to the source electrode and the drain electrode, and a contact hole for electrical connection between the conductor layer and the pixel electrode is formed above at least one of the storage capacitance cell and the drain electrode.

This arrangement is advantageous in that, since the regions above the storage capacitance cell and the drain electrode are basically covered with a black matrix, the aperture ratio is not reduced by the formation of the contact hole.

Alternatively, the liquid crystal display of the present invention may be arranged so that a portion of the drain electrode is extended over a portion of the scanning line for driving the adjacent pixel electrode, and the extended portion of the drain electrode and the scanning line portion form a storage capacitance cell.

In this arrangement, the extended portion of the drain electrode itself constitutes the storage capacitance cell. In other words, a contact hole for connection between the drain electrode and the pixel electrode in the case where a conductor layer for a storage capacitance cell is provided separately from the drain electrode and a contact hole for connection between the conductor layer and the pixel electrode can be combined into one contact hole. It is possible to increase the aperture ratio by removing one contact hole in this manner. If the liquid crystal display of the present invention is constructed as a multicolor display, it is desirable that a set of color filter elements respectively having different fundamental colors for multicolor display should be iteratively arranged as an iteration unit along each scanning line. Preferably, in such a case, the number of scanning lines is set to the number obtained by multiplying the total number of pixels along the signal line direction by the number of fundamental colors.

In this construction, if the number of scanning lines is set to the number obtained by multiplying the total number of pixels along the signal line direction by the number of fundamental colors, and if the number of fundamental colors is three, the number of scanning lines may be increased thrice the number of scanning lines in the conventional arrangement (by being multiplied by the number of fundamental colors) in order to obtain the same number of pixels as that in the conventional arrangement. In such a case, however, the number of signal lines is reduced to ⅓ of that in the conventional arrangement. Ordinarily, the power consumption of source drivers required to process multi-gradation signals of about six to eight bits at a high speed is larger than that of 1-bit gate drivers for performing on-off control of pixel electrodes for liquid crystal display. The price of such source drivers is high, and the yield is low because the number of transistors is large. However, if the above-described arrangement is used, the number of signal lines is reduced. Correspondingly, the number of source drivers employed can be reduced in comparison with the conventional arrangement, thereby achieving a reduction in power consumption, a reduction in manufacturing cost and an increase in yield.

The liquid crystal display thus arranged can be driven by one of the following methods:
1) a method of performing non-interlaced scanning of all the scanning lines during one frame period;
2) a method of dividing one frame into a plurality of fields and performing interlaced scanning through each of the fields; and
3) a method of enabling a user to freely select non-interlaced scanning of the method (1) and interlaced scanning of the method (2) by using changing means.

In the method (1), since the number of scanning lines is trebled in the above-described arrangement, driving is performed at a trebled scanning speed. That is, the frequency at which the gate drivers scan the scanning lines is thrice that in the conventional arrangement. However, if ordinary conditions (e.g., VGA (640×480) display, a frame frequency of 60 Hz, etc.) are set, gate drivers which are equivalent in performance to those conventionally used may suffice. On the other hand, the frequency of dot clock for the source drivers is not changed since the number of signal lines is reduced to ⅓ while the frequency of scanning of the source drivers is trebled. Consequently, the same gate drivers and source drivers as those used in the conventional display can be used in the display constructed as described above. The liquid crystal display of the present invention can operate without any reduction in image quality in comparison with the liquid crystal display of the conventional construction. Even though the power consumption of the gate drivers is increased by trebling the gate driver frequency, the effect of reducing the number of high-power-consumption source drivers prevails over the effect of increasing the power consumption. Thus, the total power consumption can be reduced.

The method (2) is a method of dividing one frame into three fields and performing scanning through one field by skipping two lines. In this case, the number of scanning lines scanned by the gate drivers during one field period is ⅓ of the total number of scanning lines. Therefore, even though the number of scanning lines is trebled by the structural effect, the number of scanning lines scanned is the same as that in the conventional system, and the frequency can be reduced to ⅓ that in the method (1). Correspondingly, the frequency of dot clock for the source drivers is reduced to ⅓ that in the method (1). Thus, this method enables each of the frequency at which the gate drivers scan the scanning lines and the frequency of dot clock for the source drivers to be reduced to ⅓, and further reduces the power consumption in comparison with the method (1).

The color layout may be such that the set of filter elements having the fundamental colors is iteratively arranged along the each of the signal lines while the order of the fundamental colors is fixed with respect to the progress of iteration, and the filter elements arranged along each of the scanning lines has the same color.

This fundamental color layout is a lateral stripe layout. In a case where a digital image is processed by signal processing with a personal computer, particularly in a case where error diffusion processing based on calculating a correlation between adjacent pixels is performed, the image processing can be facilitated by using such a color layout because signals of dots adjacent to each other in the horizontal direction are the same. Advantageously, in such a case, an effect of limiting memory consumption can be expected.

Another color layout may be used in which the set of filter elements is iteratively arranged along the each signal line while the order of the fundamental colors is fixed with respect to the progress of iteration, each of the fundamental colors appearing along a direction at an angle from the direction along the scanning lines, each adjacent pair of the fundamental colors along each of the scanning lines being different from each other.

This layout is a mosaic layout such that an image such as a landscape can be displayed without lateral stripe noise, and can be formed more naturally and smoothly.

BRIEF DESCRIPTION OF THE DRAWINGS

FIG. 10 is a diagram showing an example of RGB layout of a color filter in the arrangement shown in FIG. 9;

FIG. 11 is a diagram showing another example of RGB layout of a color filter in the arrangement shown in FIG. 9;

DESCRIPTION OF THE PREFERRED EMBODIMENTS

A first embodiment of the present invention will be described below with reference to FIGS. 1 and 2.

Figure 1:
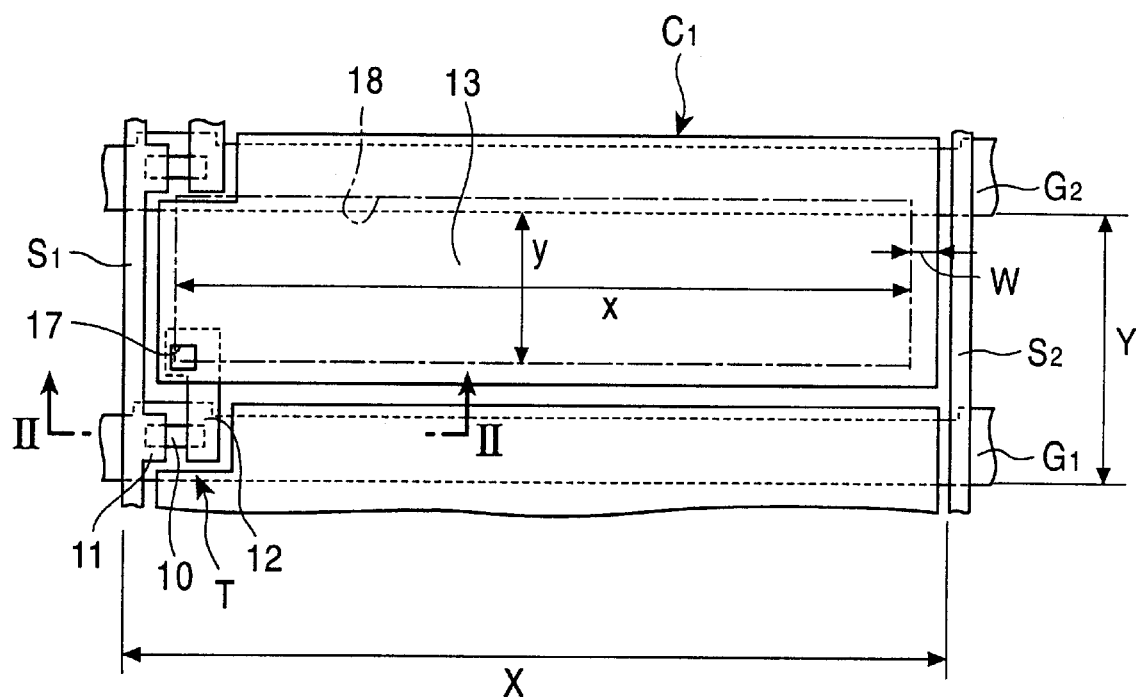
FIG. 1 is a plan view of an arrangement on a thin-film transistor array substrate of a liquid crystal display which represents a first embodiment of the present invention.
Figure 2:
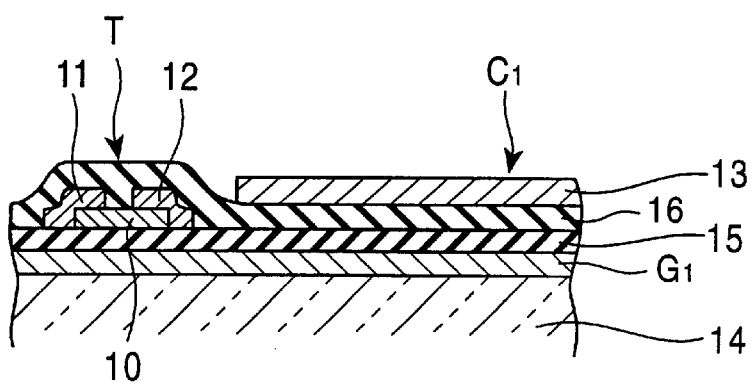
FIG. 2 is a cross-sectional view taken along the line II—II of FIG. 1.

FIGS. 1 and 2 illustrate a thin-film transistor array substrate which is one of a pair of substrates for an active matrix liquid crystal display (hereinafter referred to simply as a liquid crystal display) which represents an embodiment of the present invention. FIG. 1 is a plan view of a portion of the display partitioned with scanning lines and signal lines and corresponding to one dot of a displayed image. FIG. 2 is a cross-sectional view of this display portion. An inverted staggered type (bottom gate type) thin-film transistor is used as a thin-film transistor for this display.

Referring to FIG. 1, conductors which extend laterally are scanning lines $G_1$ and $G_2$ while conductors which extend vertically are signal lines $S_1$ and $S_2$. The liquid crystal display of this embodiment is arranged as a multicolor display, and the region defined between the scanning lines $G_1$ and $G_2$ and the signal lines $S_1$ and $S_2$ forms one dot (one pixel in the case of a monochromatic display). The pitches between the conductors are such that, if the pitch between the adjacent signal lines is X while the pitch between the adjacent scanning lines is Y, X>Y, for example, X is thrice Y. This relationship is reverse to that in the conventional structure. An oblong dot is formed by the display. At the lower left corner of the dot as viewed in FIG. 1, the scanning line $G_1$, a semiconductor active film 10 for forming a channel region, a source electrode 11 extending from the signal line $S_1$ and a drain electrode 12 are provided to form a thin-film transistor T, and a pixel electrode 13 is connected to the thin-film transistor T. Since the dot itself is long sideways, the width of the pixel electrode 13 along the scanning line direction is naturally larger than that along the signal line direction. The pixel electrode 13 is formed so as to have an extension over a portion of the preceding-stage scanning electrode $G_2$ for driving the adjacent pixel electrode.

In the structure of the thin-film transistor T, as shown in section in FIG. 2, the semiconductor active film 10 is provided over the scanning line $G_1$ formed on the transparent substrate 14 made of glass or the like, with a gate insulating film interposed between the film 10 and the substrate 14. The source electrode 11 extending from the signal line $S_1$ and the drain electrode 12 are provided on the semiconductor active film 10. The scanning line $G_1$, the semiconductor active film 10, the source electrode 11 and the drain electrode 12 constitute the inverted staggered thin-film transistor T. A pixel electrode 13 portion is formed on a passivation film 16 (interlayer insulating film) which covers the source electrode 11 and the drain electrode 12. The pixel electrode 13 is electrically connected to the drain electrode 12 of the thin-film transistor T via a contact hole 17 shown in FIG. 1. An adjacent pixel electrode 13 forms a storage capacitance cell $C_1$ through the gate insulating film and the passivation film in association with the scanning line $G_1$ located under the pixel electrode 13. Each of the scanning line $G_1$ and the signal line $S_1$ is formed of aluminum (Al), the semiconductor active film 10 is formed of amorphous silicon (a-Si), each of the gate insulating film 15 and the passivation film 16 is formed of silicon nitride (SiNx), and the pixel electrode 13 is formed of indium-tin oxide (ITO).

Figure 14:
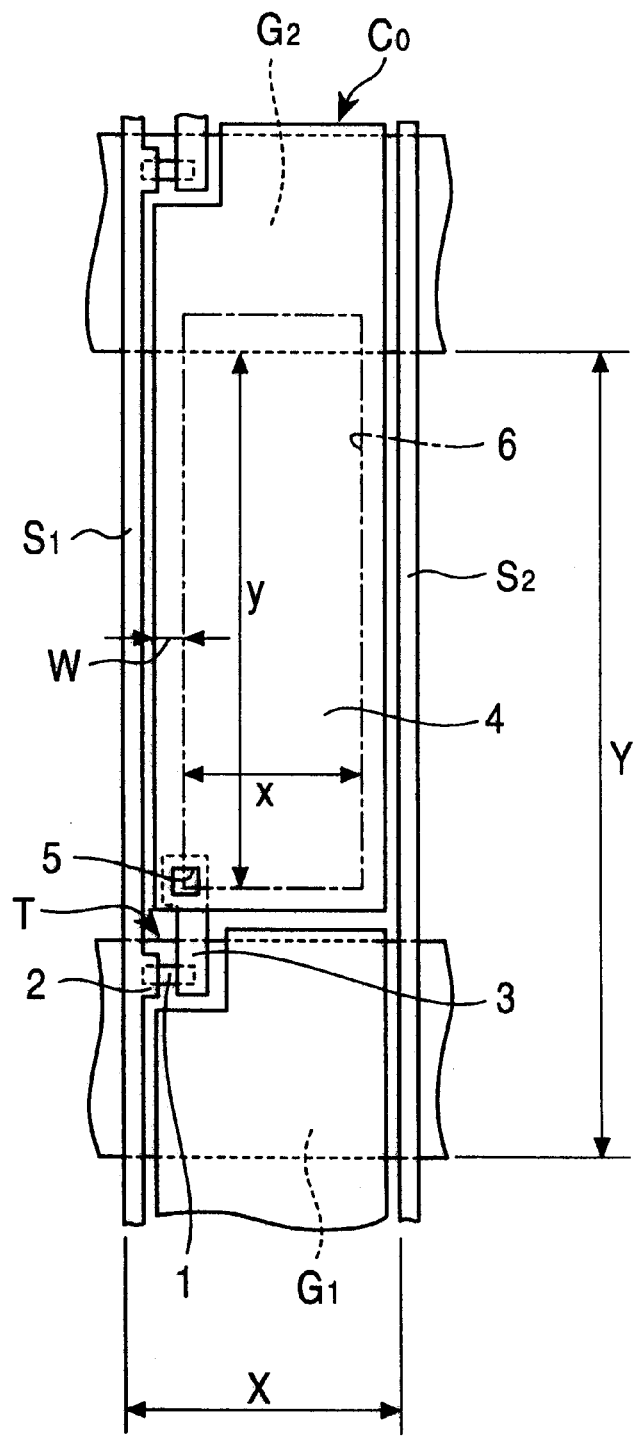
FIG. 14 is a plan view of an arrangement on a thin-film transistor array substrate a conventional liquid crystal display.

On the other hand, on the substrate opposed to the thin-film transistor array substrate are provided a common electrode (not shown) and a black matrix (not shown) for stopping light at regions where the thin-film transistor T, the scanning lines $G_1$ and $G_2$, the signal lines $S_1$ and $S_2$ are provided. The black matrix has a rectangular aperture 18 indicated by the dot-dash line in FIG. 1. Light can pass through the aperture 18. The aperture 18 corresponds to an effective display area which contributes essentially to display. The thin-film transistor array substrate of this embodiment is designed by using the same design rule as the conventional thin-film transistor array substrate shown in FIG. 14, and the area of the storage capacitance cell of this embodiment is substantially equal to that in the conventional arrangement shown in FIG. 14.

Comparison of the aperture ratio of on the thin-film transistor array substrate of this embodiment with that in the above-described conventional structure will now be described. If, as also described above with respect to the conventional art, the light stop area of the superposed portions of the pixel electrode 13 and the black matrix is S; the width of the aperture along the scanning line direction is x; and the width of the aperture along the signal line direction is y, S=W×(x+2y) (equation (1)).

In the conventional structure, if x=a, y=3a (a: constant), $$S=W\times(x+2y)=7Wa$$

since y is thrice x.

On the other hand, in this embodiment of the present invention, if x=3a, y=a (a: constant), $$S=W\times(x+2y)=5Wa$$

since x is thrice y.

That is, the light stop area S in this embodiment is smaller, 5/7 (about 71%) of the light stop area S in the conventional structure. Therefore, the aperture ratio in the structure of the present invention is higher than that in the conventional structure. While the aperture ratio in the illustrated example of the conventional structure (FIG. 14) is 34.8%, the aperture ratio in this embodiment of the present invention is 46.8%. Thus, in the liquid crystal display of this embodiment, the aperture ratio can be increased while the same storage capacitance as that in the conventional structure is maintained.

Conversely speaking, if the same aperture ratio as that achieved by the conventional art suffices, the storage capacitance value can be increased. As a result, flicker and crosstalk due to off current in the thin-film transistors can be reduced.

Further, the capacitive coupling between the opposed electrode provided on the substrate opposed to the thin-film transistor array substrate and the scanning lines $G_1$ and $G_2$ becomes stronger while the capacitive coupling between the opposed electrode and the signal lines $S_1$ and $S_2$ becomes weaker. Therefore, crosstalk due to variation in the potential of the opposed electrode can be reduced.

A second embodiment of the present invention will be described with reference to FIGS. 3 and 4.

Figure 3:
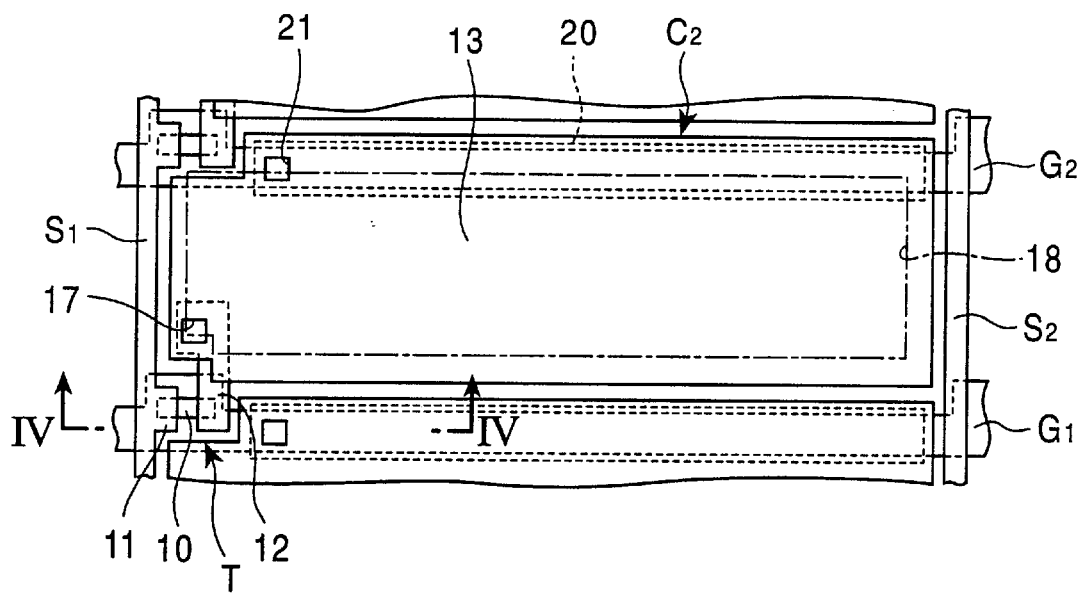
FIG. 3 is a plan view of an arrangement on a thin-film transistor array substrate of a liquid crystal display which represents a second embodiment of the present invention.
Figure 4:
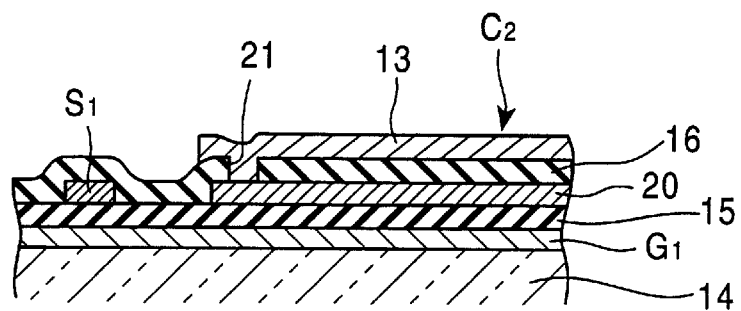
FIG. 4 is a cross-sectional view taken along the line IV—IV of FIG. 3.

FIGS. 3 and 4 are diagrams showing a thin-film transistor array substrate in a liquid crystal display formed as the second embodiment. FIG. 3 is a plan view showing one dot and FIG. 4 is a cross-sectional view.

The liquid crystal display of this embodiment differs from that of the first embodiment in the construction of the storage capacitance cell. That is, while one pixel electrode and one scanning line constitute a storage capacitance cell in the first embodiment, one conductor layer electrically connected to one pixel electrode and one scanning line constitute a storage capacitance cell in this embodiment. Other components are generally the same as those in the first embodiment. The components as those shown in FIGS. 1 and 2 are indicated by the same reference characters in FIGS. 3 and 4, and detailed description for them will not be repeated.

Referring to FIG. 3, the liquid crystal display of this embodiment has the same arrangement of scanning lines $G_1$ and $G_2$ and the signal lines $S_1$ and $S_2$ as that shown in FIG. 1, and forms an oblong dot. A pixel electrode 13 connected to a thin-film transistor T is formed so as have an extension over a portion of the scanning line $G_2$ for driving the adjacent preceding-stage pixel electrode.

In this embodiment, a conductor layer 20 slightly larger in width than the scanning line $G_2$ is formed so as to be superposed on the scanning line $G_2$. As shown in FIG. 4, this conductor layer 20 is a layer corresponding to the layer forming the signal line S1 on the gate insulating film 15. Passivation film 16 is formed on the conductor layer 20. The conductor layer 20 is electrically connected to an adjacent pixel electrode 13 via a contact hole 21 formed through the passivation film 16. Thus, in this embodiment, the conductor layer 20 electrically connected to the pixel electrode 13 forms a storage capacitance cell $C_2$ through the gate insulating film 15 in association with the scanning line $G_1$ located under the conductor layer 20. While the dielectric layer of the storage capacitance cell in the liquid crystal display of the first embodiment is the lamination of the gate insulating film and the passivation film, the dielectric layer of the storage capacitance cell $C_2$ in the liquid crystal display of this embodiment is formed only of the gate insulating film 15. That is, the thickness of the dielectric layer of this embodiment is smaller than that in the first embodiment, and the dielectric constant of the gate insulating film 15 is set to a large value for the purpose of reducing the on resistance of the thin-film transistor T. Therefore, the electrostatic capacitance per unit area is increased. Accordingly, if the liquid crystal display of this embodiment is designed so as to obtain the same storage capacitance value as that in the first embodiment, the area of the capacitance cell can be reduced in comparison with that in the first embodiment. Consequently, the liquid crystal display of this embodiment can have an aperture ratio higher than that in the first embodiment. For example, if each of the materials of the gate insulating film 15 and the passivation film 16 is SiNx; the thickness of the gate insulating film 15 is 3000 Å; and the thickness of the passivation film 16 is 4000 Å, the aperture ratio in the structure of the first embodiment is 46.8% and, in contrast, the aperture ratio in the structure of this embodiment is 52.7%.

A third embodiment of the present invention will be described with reference to FIG. 5.

Figure 5:
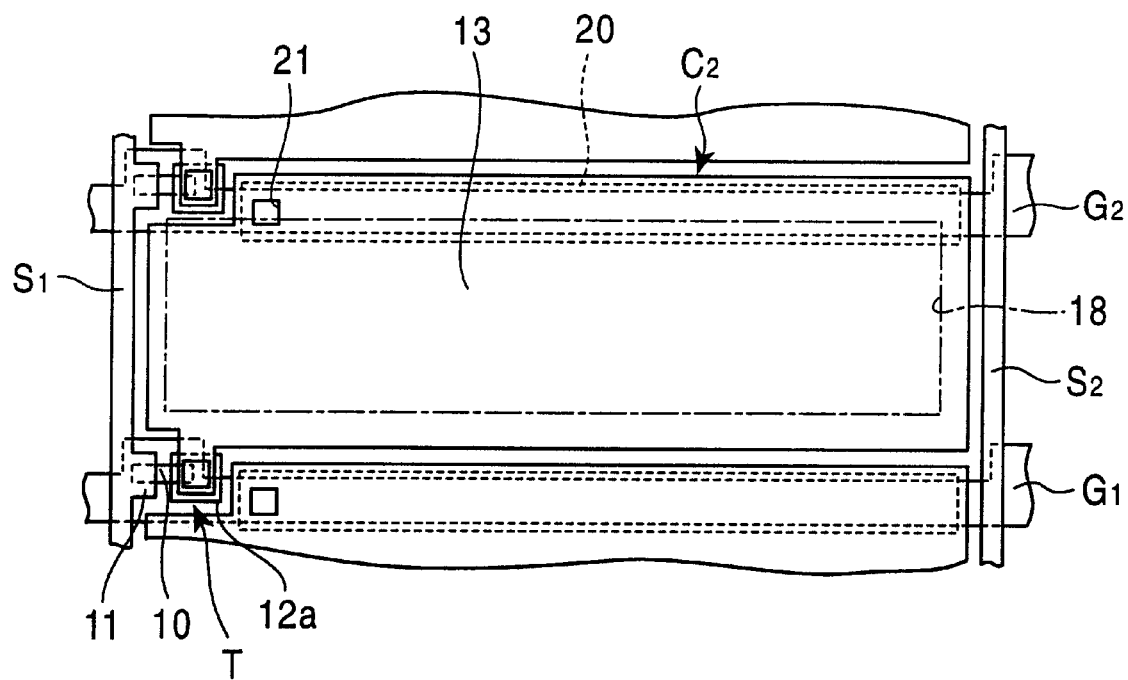
FIG. 5 is a plan view of an arrangement on a thin-film transistor array substrate of a liquid crystal display which represents a third embodiment of the present invention.

FIG. 5 is a plan view of a thin-film transistor array substrate of the third embodiment.

In the liquid crystal display of this embodiment, a conductor layer connected to one pixel electrode and one scanning line form a storage capacitance cell, as are those in the second embodiment. However, the position of a contact hole for connection between one drain electrode and one pixel electrode in this embodiment is different from that of the corresponding contact hole in the second embodiment. Components of this embodiment corresponding or identical to those in the first and second embodiments are indicated in FIG. 5 by the same reference characters as those in FIGS. 1 and 3, and detailed description for them will not be repeated.

In the second embodiment, as shown in FIG. 3, the drain electrode 12 is shaped in such a manner as to extend from a position on the scanning line $G_1$ for the corresponding stage toward the preceding-stage scanning line $G_2$ and to have a large-width end portion, and the contact hole 17 for electrical connection to one pixel electrode 13 is formed on the large-width portion extending on the pixel electrode 13 side.

In this embodiment, as shown in FIG. 5, a drain electrode 12a having a generally square shape is formed above semiconductor active film 10 on the scanning line $G_1$, a portion of the pixel electrode 13 extends above the drain electrode 12a, and a contact hole 17a for electrical connection between the pixel electrode 13 and the drain electrode 12a is formed between the overlap portions of this pixel electrode 13 extension and the drain electrode 12a.

The structure of the storage capacitance cell $C_2$ of this embodiment is the same as that in the second embodiment.

In this embodiment, the contact hole 17a for connection between the pixel electrode 13 and the drain electrode 12a is located above the scanning line $G_1$. Basically, the region on the scanning line to be provided with a black matrix portion and does not influence setting of the aperture ratio. Thus, while the second embodiment has a drawback in that the aperture ratio is reduced because of the provision of the contact hole 17 at a portion of the pixel electrode 13 for the effective display area, this embodiment has the advantage of avoiding such a reduction in aperture ratio with respect to the provision of the contact hole 17a.

A fourth embodiment of the present invention will be described with reference to FIG. 6.

Figure 6:
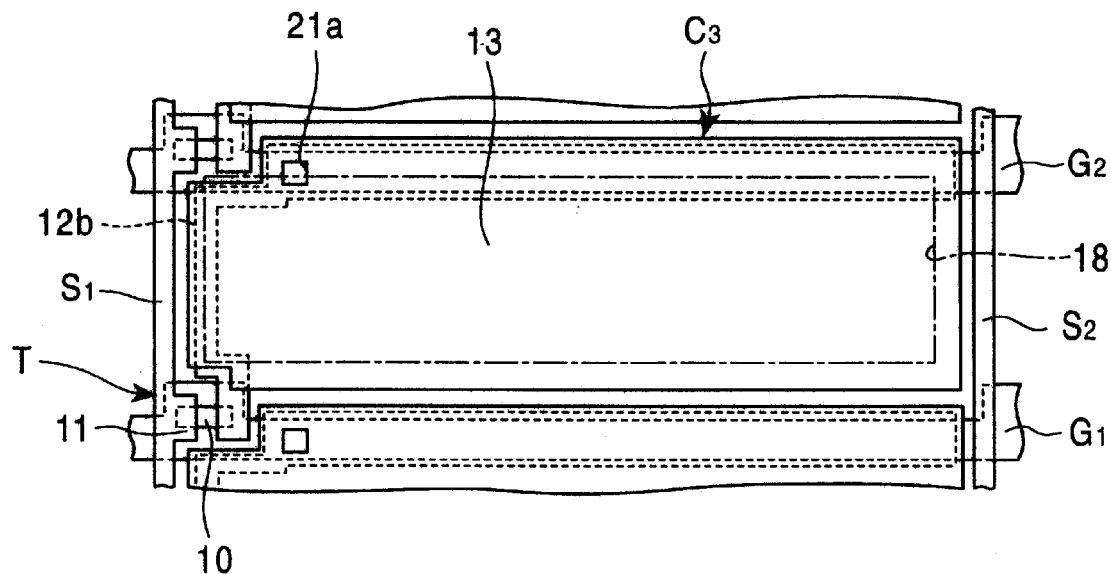
FIG. 6 is a plan view of an arrangement on a thin-film transistor array substrate of a liquid crystal display which represents a fourth embodiment of the present invention.

FIG. 6 is a plan view of a thin-film transistor array substrate of the fourth embodiment.

In the liquid crystal display of this embodiment, a conductor layer connected to one pixel electrode and one scanning line form a storage capacitance cell, as are those in the second and third embodiments. However, this embodiment differs from the second and third embodiments in that an element corresponding to the conductor layer in the second and third embodiments is formed integrally with the drain electrode. Components of this embodiment corresponding or identical to those in the first to third embodiments are indicated in FIG. 6 by the same reference characters as those in FIGS. 1, 3, and 5, and detailed description for them will not be repeated.

In the liquid crystal display of this embodiment, as shown in FIG. 6, a drain electrode 12b extends along an edge of the pixel electrode 13 and along the signal line $S_1$ and extends over a portion of the preceding-stage scanning line $G_2$ for driving the adjacent pixel electrode. The scanning line $G_2$ and the portion of the drain electrode 12b extending over the preceding-stage scanning line $G_2$ form a storage capacitance cell $C_3$. In the second and third embodiments, since the conductor layer 20 and the drain electrode 12 or 12a forming a storage capacitance cell are separate from each other, it is necessary to provide two contacts holes, i.e., the contact hole 21 for connection between the conductor layer 20 and the pixel electrode 13 and the contact hole 17 or 17a for connection between the drain electrode 12 or 12a and the pixel electrode 13. In contrast, in this embodiment, the extension of the drain electrode 12b itself constitutes the storage capacitance cell $C_3$, so that only one contact hole 21a provided in place of the two contact holes suffices. The contact hole 21a is provided above the preceding-stage scanning line $G_2$, as shown in FIG. 6.

According to this embodiment, as described above, the number of contact holes in the region corresponding to one dot, two contact holes in the second and third embodiments, can be reduced to one. Moreover, the one contact hole 21a is formed in the region on the scanning line $G_2$ over which a black matrix portion extends. As a result, the aperture ratio can be further increased in comparison with the second and third embodiments. While the aperture ratio in the structure of the second embodiment shown in FIG. 3 is 52.7%, the aperture ratio in the structure of the embodiment shown in FIG. 6 can be increased to 54%.

A fifth embodiment of the present invention will be described with reference to FIG. 7.

Figure 7:
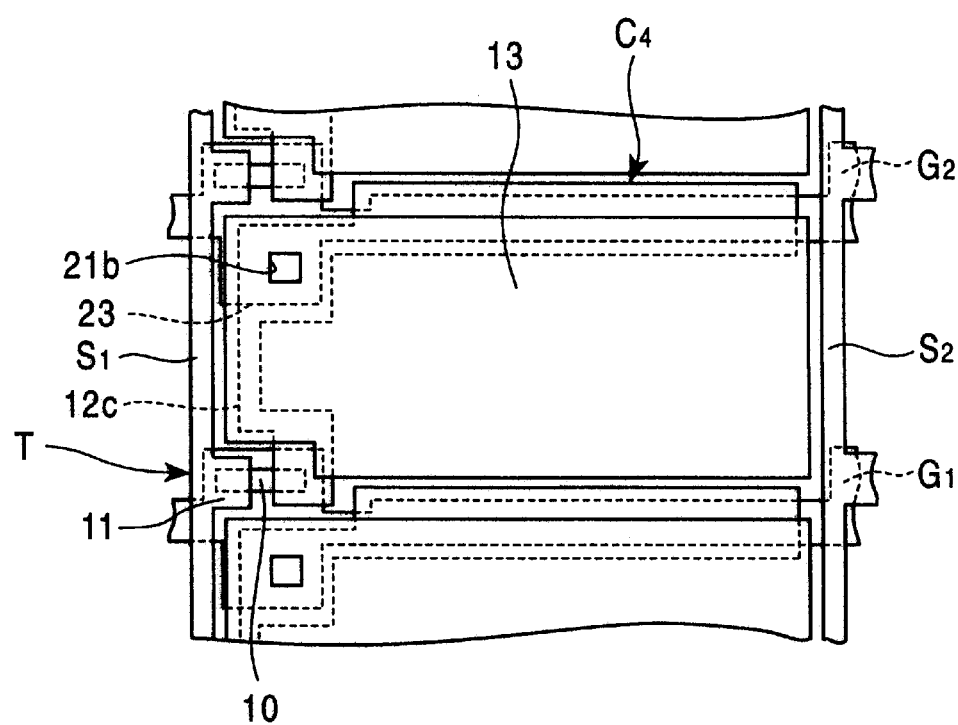
FIG. 7 is a plan view of an arrangement on a thin-film transistor array substrate of a liquid crystal display which represents a fifth embodiment of the present invention.

FIG. 7 is a plan view of a thin-film transistor array substrate of the fifth embodiment.

In the liquid crystal display of this embodiment, a conductor layer constituting a storage capacitance cell is formed integrally with a drain electrode, as is that in the fourth embodiment. However, this embodiment differs from the fourth embodiment only in location of a contact hole. Components of this embodiment corresponding or identical to those in the fourth embodiment are indicated in FIG. 7 by the same reference characters as those in FIG. 6 and detailed description for them will not be repeated.

In this embodiment, as shown in FIG. 7, the scanning line $G_2$ has a portion 23 projecting on the side remote from the side where thin-film transistor T is formed, and a portion of a drain electrode 12c extended to form a storage capacitance cell $C_4$ extends over the projecting portion 23 of the scanning line $G_2$. A contact hole 21b is formed in a region where an extending portion of the drain electrode 12c is superposed on the projecting portion 23 of the scanning line $G_2$.

While the contact hole 21a of the fourth embodiment is placed above the straight scanning line $G_2$, the component layout in the structure of the embodiment shown in FIG. 7 can be used effectively in a case where a contact hole cannot be formed above the straight portion of the scanning line $G_2$ for a design rule reason. If the structure shown in FIG. 7 is used, the aperture ratio is reduced due to the provision of the contact hole 21b in comparison with the fourth embodiment, but the contact hole 21b formation region, which adds to the light stop portions, can be effectively utilized as a portion of the storage capacitance cell $C_4$, so that the area of the other portion of the storage capacitance cell $C_4$ can be minimized.

The four examples of the thin-film transistor array substrate which is one of the pair of substrates for the liquid crystal display have been described. The configuration of the entire liquid crystal display using the described substrates and a method of driving the liquid crystal display will next be described.

Figure 8:
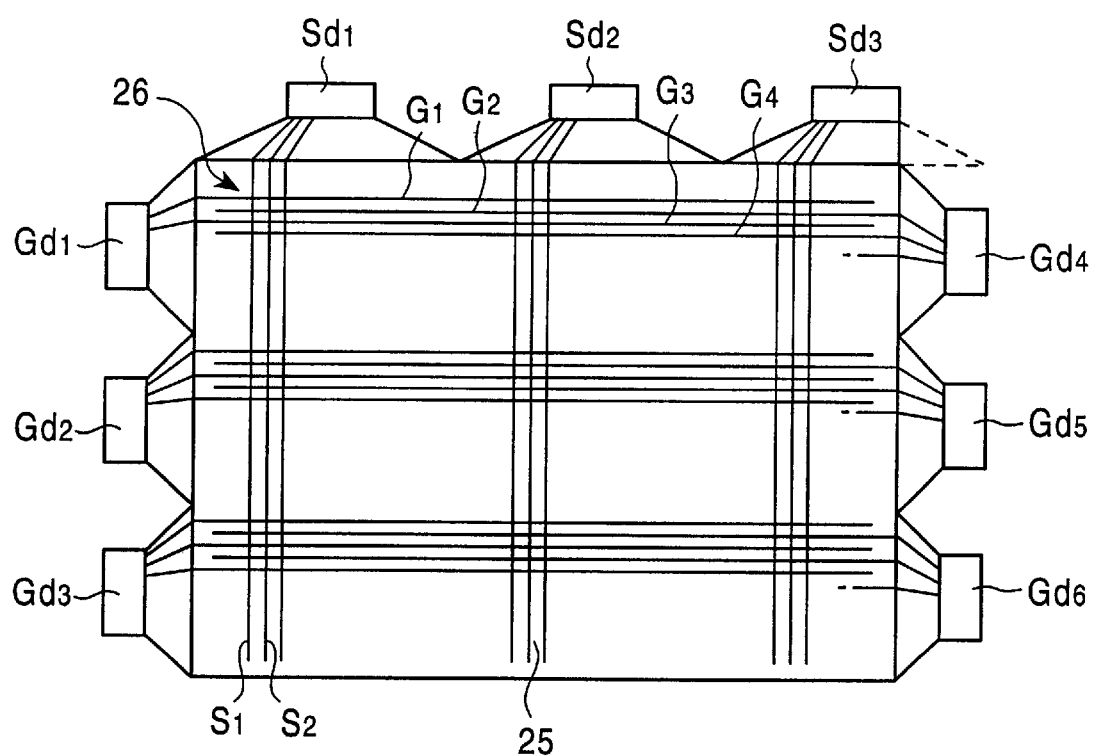
FIG. 8 is a plan view of the configuration of a liquid crystal display using the thin-film transistor array substrate in the embodiments of the present invention.

FIG. 8 shows en embodiment of the liquid crystal display to which one of the thin-film transistor array substrates of the above-described embodiment is applied. In this embodiment, a liquid crystal is enclosed between two transparent substrates to form a liquid crystal display device 25. Three source drivers Sd ($Sd_1$ to $Sd_3$) for signal line drive are provided along upper end portions of the transparent substrates of the liquid crystal display device 25. Six gate drivers Gd ($Gd_1$ to $Gd_6$) are provided along left and right side portions of the transparent substrates of the liquid crystal display device 25, that is, the group of three gate drivers $Gd_1$ to $Gd_3$ and the group of three gate drivers $Gd_4$ to $Gd_6$ are respectively provided along the left and right side portions of the transparent substrates.

Figure 9:
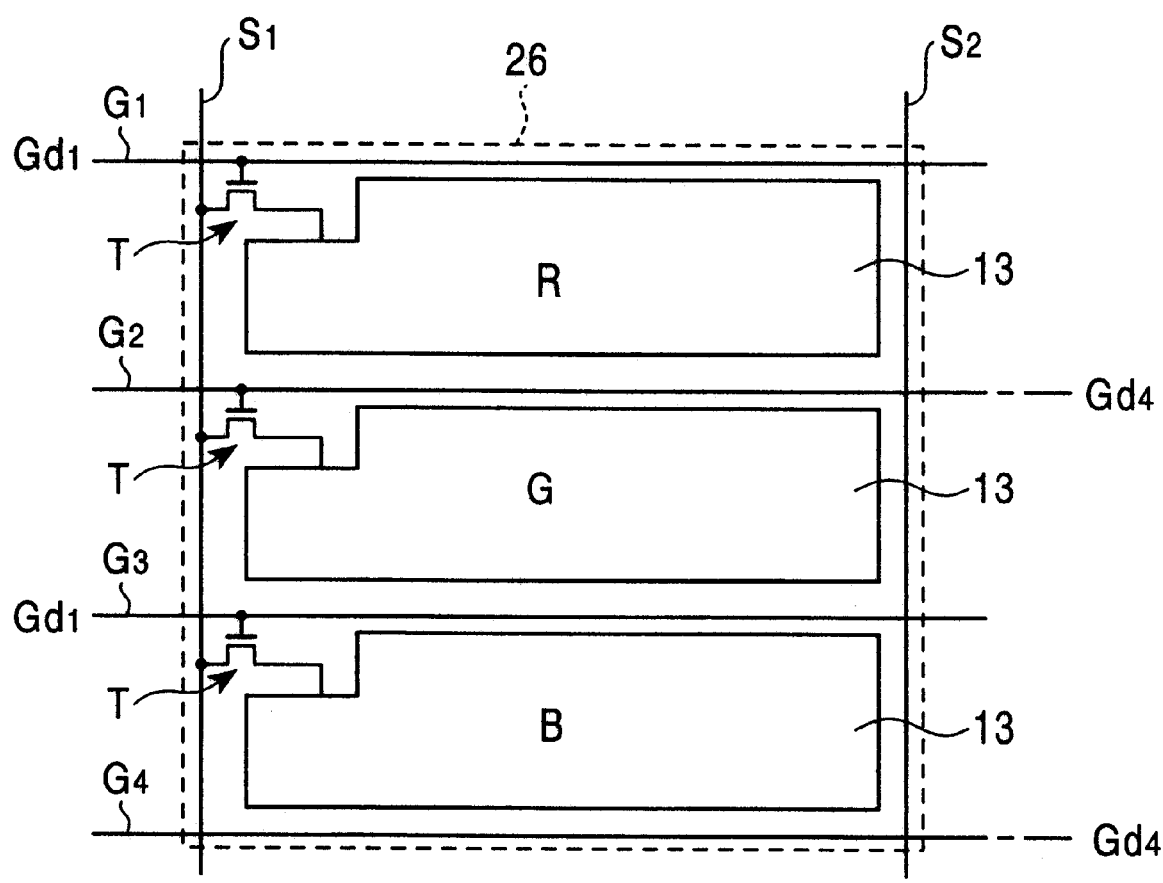
FIG. 9 is an enlarged view of one pixel in the liquid crystal display shown in FIG. 8.

A common electrode and color filter elements are provided on one of the two transparent substrates constituting the liquid crystal display device 25. Thin-film transistor circuits are formed on the other transparent substrate. FIG. 9 shows an enlarged view of the portion of the circuit configuration corresponding one pixel.

One pixel 26 in this embodiment corresponds to regions defined between two column signal lines $S_1$ and $S_2$ and four row scanning lines $G_1$, $G_2$, $G_3$, and $G_4$. One pixel electrode 13 is provided in the region which is surrounded by the signal lines $S_1$ and $S_2$ and the scanning lines $G_1$ and $G_2$, and in which one dot is formed. Another pixel electrode 13 is provided in the region which is surrounded by the signal lines $S_1$ and $S_2$ and the scanning lines $G_2$ and $G_3$, and in which one dot is formed. Another pixel electrode 13 is provided in the region which is surrounded by the signal lines $S_1$ and $S_2$ and the scanning lines $G_3$ and $G_4$, and in which one dot is formed. Dots in the three regions form one pixel 26. A thin-film transistor which operates as a switching device is formed at a side portion of each pixel electrode 13. Color filter elements are provided on the transparent substrate opposed to the substrate on which the pixel electrodes 13 are formed. In this embodiment, color filter elements R, G and B are arranged corresponding to a plurality of pixels, as shown in FIG. 10. That is, with respect to the pixel shown in FIG. 9, a red color filter R is placed in such a position as to face the pixel electrode 13 forming the upper dot in the pixel, a green color filter G is placed in such a position as to face the pixel electrode 13 forming the middle dot in the pixel, and a blue color filter B is placed in such a position as to face the pixel electrode 13 forming the lower dot in the pixel. In this embodiment, the color filter elements are arranged in the order of RGB, RGB . . . along the direction in which each signal line extends (vertical direction as viewed in FIG. 10), and arranged in rows corresponding to the number of scanning lines along the scanning line direction in the order of R, R, R . . . along the scanning line No. 1 direction (horizontal direction as viewed in FIG. 10), in the order of G, G, G . . . along the scanning line No. 2 direction, in the order of B, B, B . . . along the scanning line No. 3 direction, in the order of R, R, R . . . along the scanning line No. 4 direction, in the order of G, G, G . . . along the scanning line No. 5 direction, and in the order of B, B, B . . . along the scanning line No. 6 direction.

In this embodiment, the number of signal lines S and the number of scanning lines provided for VGA display are 640 and 480×3=1440, respectively. The total number of pixels in this embodiment is 640×480=307200, the same number as that in the display of the conventional arrangement described below with reference to FIG. 15. The number of signal lines is only ⅓ that in the conventional arrangement. However, the number of scanning lines (multiplied by the number of fundamental colors) is thrice that in the conventional arrangement shown in FIG. 15.

In a case where 240-pin drive large-scale integrated circuits (LSI) equal to those conventionally used are used for drive in this arrangement, the set of three source drivers Sd is capable of driving through 240×3=720 lines, and 80 lines can be spared if 640 lines are used for VGA. Therefore, three source drivers $Sd_1$ to $Sd_3$ are provided as shown in FIG. 8. All the terminals of two source drivers $Sd_1$ and $Sd_2$ and about 160 terminals of the third source driver $Sd_3$ are actually connected to signal lines S.

If 240-pin LSIs are used as gate drivers Gd, six 240-pin LSIs are required since the necessary number of scanning lines is 1440. Accordingly, six gate drivers $Gd_1$ to $Gd_6$ are provided, as shown in FIG. 8. The connection of scanning lines G to the gate driver $Gd_1$ and the gate driver $Gd_4$ at the upper left and upper right positions, respectively, about the transparent substrate is as described below. The odd numbered scanning lines G are connected to the upper left gate driver $Gd_1$ while the even numbered scanning lines G are connected to the upper right gate driver $Gd_4$. Thus, 480 gate lines $G_1$ to $G_{480}$ in total are connected alternately to the left gate driver $Gd_1$ and to the right gate driver $Gd_4$ in opposite directions.

Figure 15:
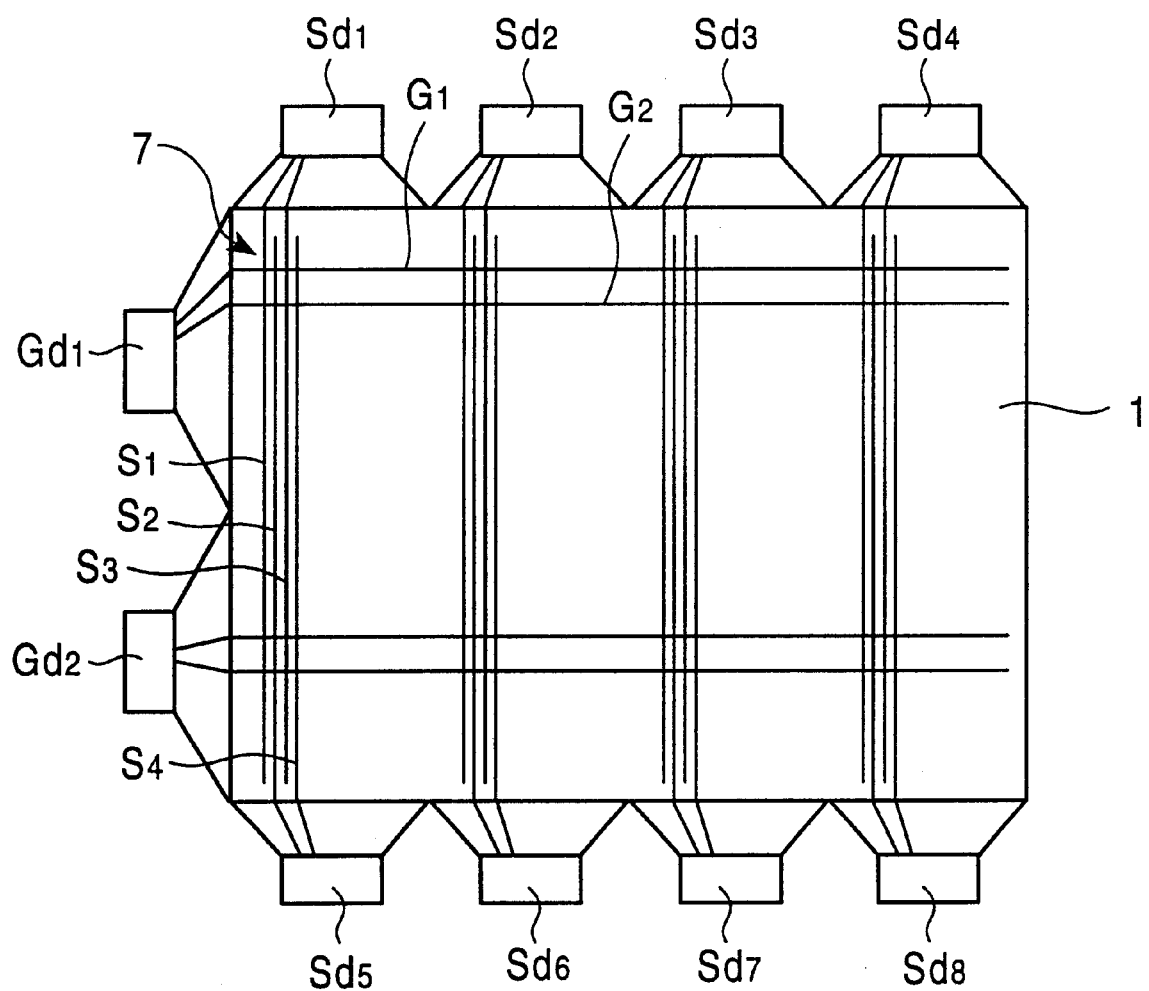
FIG. 15 is a plan view of a plan view of the configuration of a conventional liquid crystal display.
Figure 16:
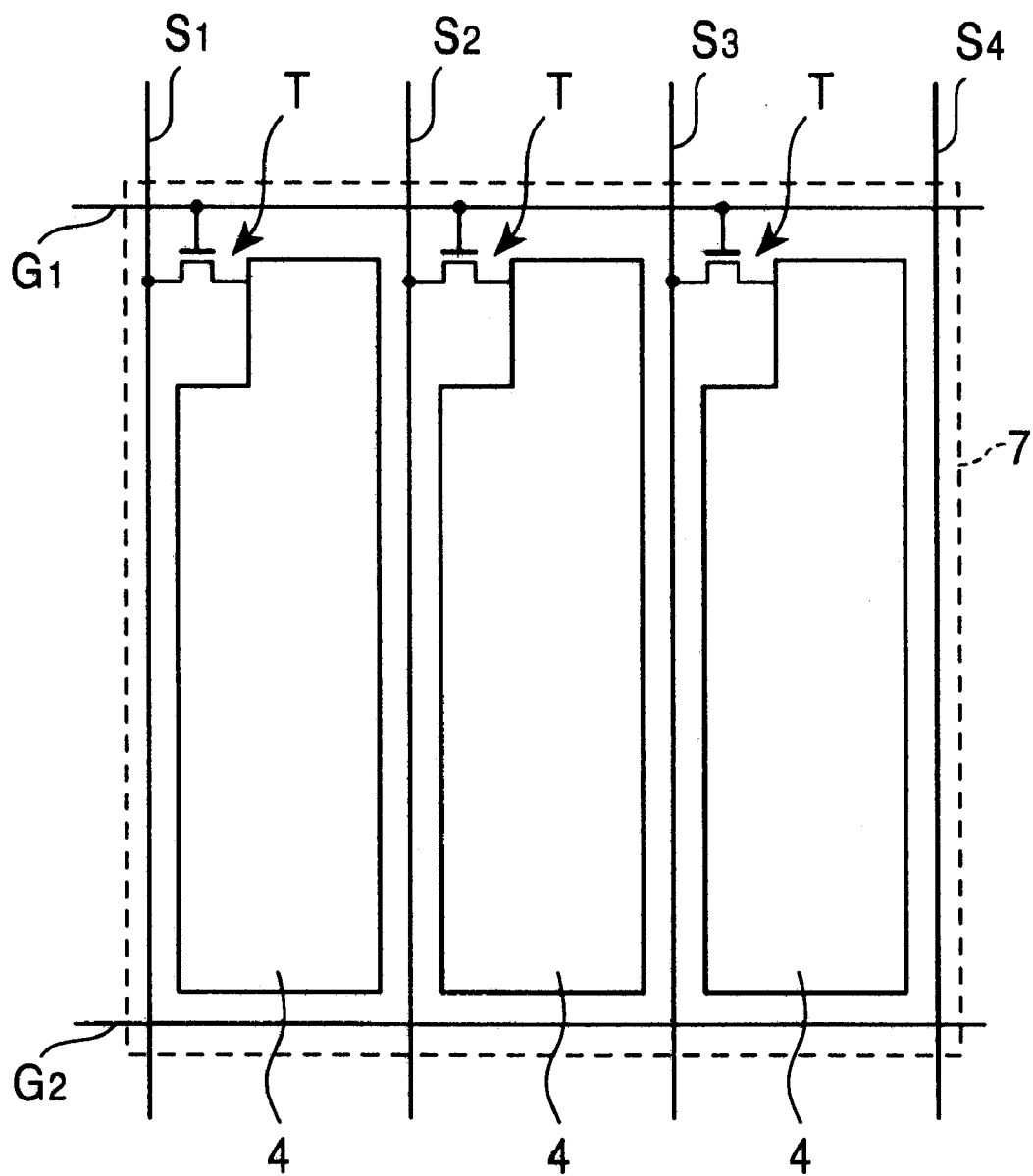
FIG. 16 is an enlarged view of one pixel in the liquid crystal display apparatus shown in FIG. 15.

FIG. 15 shows an example of the entire configuration of a conventional liquid crystal display. In the display shown in FIG. 15, a plurality of drivers Gd are connected at the left hand side of a liquid crystal display device 1 and a plurality of source drivers Sd are connected at each of the upper and lower sides of the liquid crystal display device 1. As shown in FIG. 16, column signal lines $S_1$, $S_2$, $S_3$ . . . and row scanning lines $G_1$, $G_2$ . . . are formed so as to intersect each other, and a pixel electrode 4 and a thin film transistor T are provided in each of regions defined between the signal lines and scanning lines. One dot is formed in each region where pixel electrode 4 is formed, and the set of three dots forms one pixel.

In the circuit arrangement shown in FIG. 15, pixels 7 each formed as indicated by the broken line in FIG. 16 are formed. In the above-described VGA display, 307200 pixels 7 are formed in one frame.

Each of source drivers Sd and gate drivers Gd provided in the liquid crystal display having such a number of dots is formed of one LSI having about 240 output pins. For adaptation to 1920 signal lines and 480 scanning lines used in the above-described liquid crystal display 1, there is a need to use eight 240-pin source drivers Sd (240×8=1920) and two 240-pin gate drivers Gd (240×2=480), as shown in FIG. 15.

In general, the power consumption of the source driver Sd in the above-described drivers is larger than that of the gate driver Gd, as shown below.

Driver power consumption (about 840 mW)
Gate driver Low (about 20 mW×2=40 mW, occupying 5%)
Source driver High (about 100 mW×8=800 mW, occupying 95%)

It is also known that source drivers are twice as high in unit price as gate drivers.

In view of the above-described background, there is a need to reduce the necessary number of such high-priced drivers in order to reduce the manufacturing cost and power consumption of liquid crystal displays designed so as to have a larger display area and improved gradational quality.

In this embodiment, with respect to such a need, the number of high-priced source drivers Sd can be reduced from eight, the number necessary in the conventional arrangement, to three, thus achieving a large amount of reduction in manufacturing cost. The unit price of the gate driver Gd is about half that of the source driver Sd. Therefore, even though the number of gate drivers Gd is increased from two in the conventional structure to six in this embodiment to increase the necessary cost, the amount by which the necessary cost is thereby increased is smaller than the amount of reduction in cost achieved by reducing source drivers Sd. Consequently, a reduction in cost can be achieved by reducing high-priced source drivers while the number of displayed pixels is fixed.

In this embodiment, if six gate drivers each having a power consumption of about 20 mW and three source drivers each having a power consumption of about 100 mW are used, 120 mW and 300 mW are required for the gate drivers and for the source drivers, respectively, and the total power consumption is about 420 mW, about half the power consumption of about 840 mW in the liquid crystal display based on the conventional arrangement.

Recently, liquid crystal displays have been provided which are constructed in such a manner that, when a thin-film transistor circuit is formed on a transparent substrate by using polysilicon, a thin-film transistor drive circuit is simultaneously formed on the liquid crystal display transparent substrate to incorporate the drive circuit. In such displays, however, the power consumption of source drivers Sd required to process multi-gradation signals of about six to eight bits at a high speed is larger than that of 1-bit gate drivers Gd for performing on-off control of pixel electrodes for liquid crystal display, and the yield of the displays is low because the number of source drivers Sd is large. Therefore, even in the case of a liquid crystal display incorporating drive circuits, reducing source drivers Sd by reducing the number of signal lines is effective in reducing the power consumption and in improving the yield.

In the above-described embodiment, RGB color filter elements are arranged as shown in FIG. 10. However, the RGB color filter layout is not limited to the illustrated example. Needless to say, a filter layout such as shown in FIG. 11 may be used, in which placement of filter elements in the order of R, B, and G is iterated along the scanning line No. 1, placement in the order of G, R, and B is iterated along the scanning line No. 2, placement in the order of B, G, and R is iterated along the scanning line No. 3, and placement in the order of R, B, and G is iterated along the scanning line No. 4. In this layout, the filter elements of the fundamental colors are arranged repeatedly in the same order along each scanning line Sd, the elements of each color are obliquely arranged with respect to the signal line Sd, and each adjacent pair of the fundamental colors along each scanning line are different from each other.

The RGB layout in the pattern shown in FIG. 10 is a lateral stripe layout. In a case where a digital image is processed by signal processing with a personal computer, particularly in a case where error diffusion processing based on calculating a correlation between adjacent pixels is performed, the image processing can be facilitated by using the lateral stripe layout because signals of dots adjacent to each other in the horizontal direction are the same. Advantageously, in such a case, an effect of limiting memory consumption can be expected.

The RGB layout in the pattern shown in FIG. 11 is a mosaic layout. If this layout is used, an image such as a landscape can be displayed without lateral stripe noise, and can be formed more naturally and smoothly.

Methods for driving the drive circuits in the liquid crystal display of the above-described embodiment will next be described in comparison with the method of driving the conventional liquid crystal display shown in FIGS. 15 and 16.

A case where VGA display using 640×480 dots is performed in the conventional liquid crystal display shown in FIGS. 15 and 16 will first be discussed. The frame frequency is set to 60 Hz (frames are rewritten 60 times per second), and a time period of about 16 msec is required for rewriting of one frame. That is, in the period of 16 msec, 480 scanning lines are scanned. Accordingly, the frequency at which gate drivers Gd scan the scanning lines one by one is 60 Hz×480 lines, i.e., about 30 kHz (with a period of about 30 μsec per line). On the other hand, on the signal line side, signals corresponding to 640×3=1920 signal lines are sent in a time series to source drivers Sd, and the source drivers Sd temporarily store the signals and then output the signals for the 1920 lines simultaneously. Accordingly, dot clock for reading the signals sent in a time series with respect to each dot has a frequency of 30 kHz×1920 lines, i.e., about 60 MHz.

Figure 12:
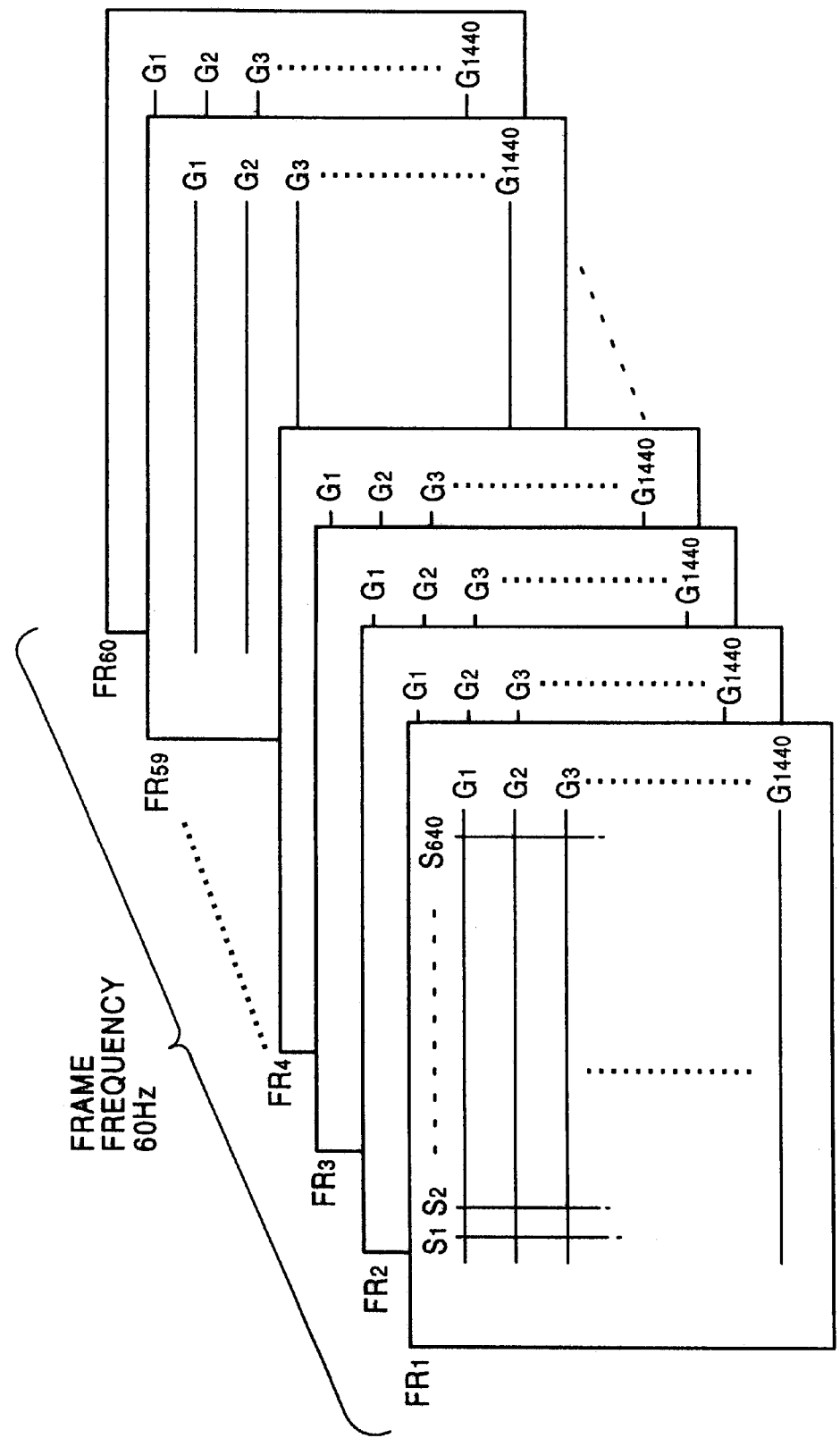
FIG. 12 is a diagram showing an example of the relationship between a frame frequency and fields in the case of driving the liquid crystal display of the present invention (non-interlaced drive system)

On the other hand, drive of the liquid crystal display based on the arrangement shown in FIGS. 8 and 9 is as described below. The frame frequency is also set to 60 Hz. Since the number of scanning lines G is trebled for RGB display of red, green and blue as shown in FIG. 12 in contrast with those in the conventional arrangement shown in FIGS. 15 and 16, the display is driven at a trebled scanning speed.

In more detail, since there are 480×3=1440 scanning lines G and 640 signal lines S, the frequency at which gate drivers Gd scan the scanning lines G is 60 Hz×480×3=about 90 kHz. Gate drivers ordinarily used are capable of driving at about 100 kHz at the maximum. Under this condition, the same gate drivers as those used in the conventional arrangement can be used.

In the arrangement shown in FIGS. 8 and 9, the number of signal lines S is reduced to ⅓ of that in the conventional arrangement shown in FIGS. 15 and 16, i.e., 640. Accordingly, the dot clock for source drivers Sd has a frequency of 90 kHz×640 lines=about 60 MHz, the same frequency as that in the conventional arrangement.

Consequently, in the arrangement shown in FIGS. 8 and 9, the same gate drivers Gd and source drivers Sd as those in the conventional arrangement shown in FIGS. 15 and 16 can be used immediately.

The advantages of use of the arrangement shown in FIGS. 8 and 9 are as described below.

1) The display based on the arrangement shown in FIGS. 8 and 9 is free from any deterioration in image quality in comparison with the liquid crystal display based on the conventional arrangement shown in FIGS. 15 and 16.

That is, with respect to a spatial appearance of one frame, the number of pixels in each of the arrangement shown in FIG. 8 and the arrangement shown in FIG. 15 is 307200, and there is no difference in resolution between the two arrangements. With respect to time, there is no problem in using the arrangement shown in FIG. 8 even for displaying a moving image since the arrangements shown in FIGS. 8 and 15 use the same frame frequency of 60 Hz.

2) In the arrangement shown in FIGS. 8 and 9, the same gate drivers and source drivers as those in the liquid crystal display based on the conventional arrangement shown in FIGS. 15 and 16 can be used, and the number of the source drivers about twice as expensive as the gate drivers can be reduced from eight to three, although it is necessary to increase the number of the low-priced gate drivers from two to six. As a result, the total manufacturing cost of the display based on the arrangement shown in FIGS. 8 and 9 can be reduced.

3) Power consumption can be reduced.

The driver power consumption is determined as described below. Six gate drivers each having a power consumption of about 20 mW are required. The total power consumption of the gate drivers is 120 mW. However, the power consumption of each gate driver is trebled since the frequency at which the gate drivers scan the scanning lines is trebled. Therefore, a total of 360 mW is necessary. On the other hand, three source drivers each having a power consumption of about 100 mW are required and the total power consumption of the source drivers is 300 mW. Consequently, a total of 660 mW is necessary for operating the two groups of drivers. About 840 mW is necessary in the display based on the conventional arrangement. Thus, the driver power consumption in the display of the present invention can be reduced to about ⅘ of the driver power consumption in the conventional display.

Figure 13:
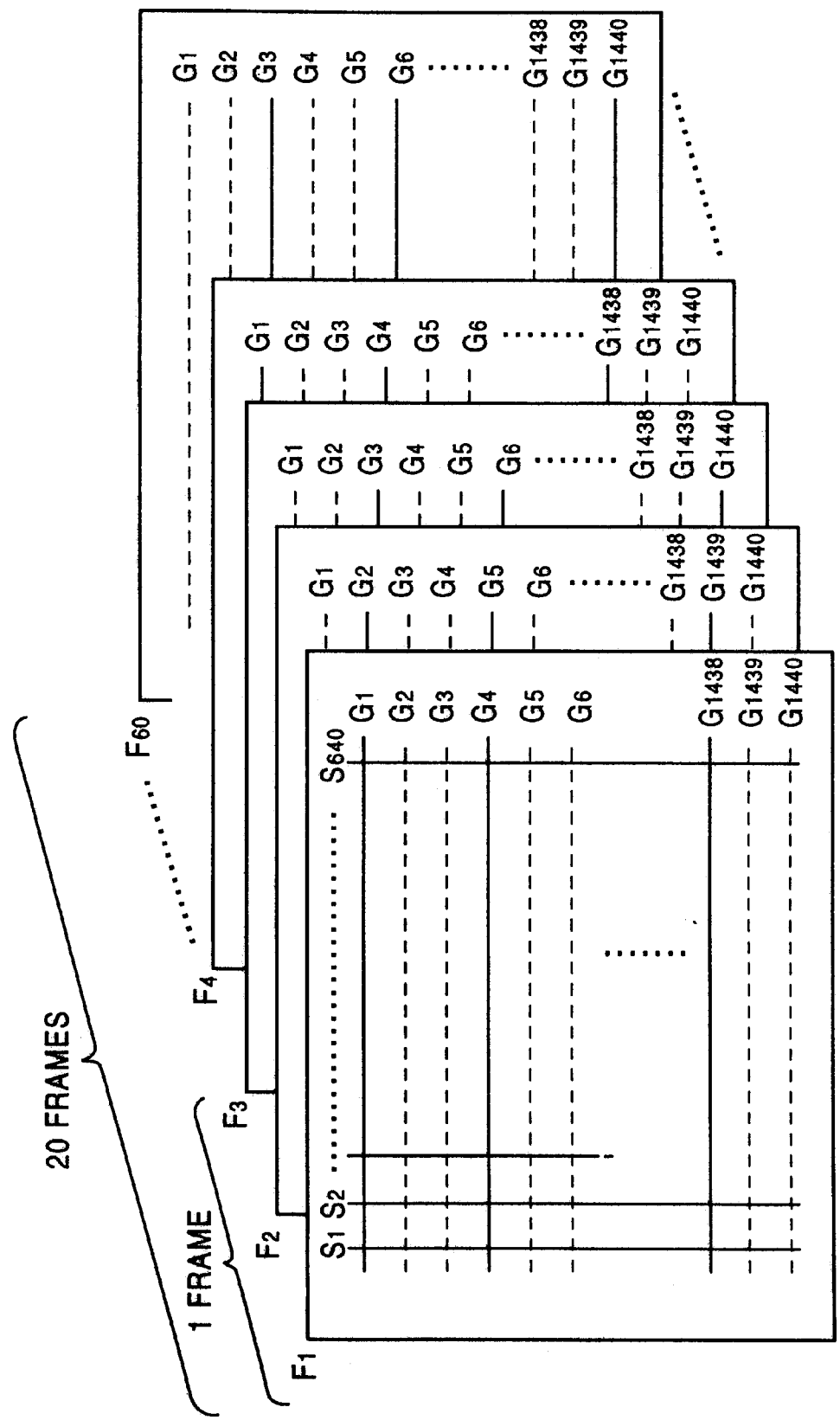
FIG. 13 is a diagram showing another example of the relationship between a frame frequency and fields in the case of driving the liquid crystal display of the present invention (interlaced drive system)

Another driving method used for driving the display based on the arrangement shown in FIGS. 8 and 9 will be described with reference to FIG. 13.

This driving method is characterized by performing interlaced scanning such that one frame is divided into three fields and scanning through one field is performed by skipping two lines.

More specifically, data for one frame is written so as to form three fields, the frame frequency is set to 20 Hz, the field frequency is set to 60 Hz (about 16 msec), and the number of scanning lines scanned in the period of one field (about 16 msec) is set to 480, ⅓ of the total number of scanning lines. Accordingly, the frequency at which the gate drivers scan the scanning line is 60 Hz×480 lines, i.e., about 30 kHz, the same frequency as that for driving in the display based on the conventional arrangement shown in FIGS. 15 and 16. In this case, the frequency can be reduced to ⅓ of that in the above-described driving method of the present invention. Correspondingly, the dot clock frequency is set to 30 kHz×640 lines, i.e., about 20 MHz, ⅓ of that in the non-interlaced drive system of the present invention equal to that in driving in the display based on the conventional arrangement shown in FIGS. 15 and 16.

The advantages of use of the above-described interlaced drive system are as described below.

1) The same gate drivers and source drivers as those used in the liquid crystal display based on the conventional arrangement shown in FIGS. 15 and 16 can be used, and the number of the expensive source drivers can be reduced from eight to three, although it is necessary to increase the number of the low-priced gate drivers from two to six. As a result, the total manufacturing cost can be reduced.

2) The driver power consumption is determined as described below. Since the frequency at which the scanning lines are scanned is the same as that in the conventional method, six gate drivers each having a power consumption of about 20 mW are required, as are those in the conventional arrangement. The total power consumption of the gate drivers is 120 mW. On the other hand, three source drivers each having a power consumption of about 100 mW are required. However, since the dot clock for them has a frequency corresponding to ⅓ of that in the conventional arrangement, the power consumption of each source driver is ⅓, i.e., 100/3 mW. Consequently, a total of 220 mW is necessary for operating the two groups of drivers while about 840 mW is necessary in the display based on the conventional arrangement. Thus, the driver power consumption in the display of the present invention can be reduced to about ¼ of the driver power consumption in the conventional display.

3) The present invention can be realized with least circuit design changes (an arrangement closer to the conventional arrangement than the former arrangement of the invention can be used). In particular, the frequency at which the gate driver scan the scanning lines may be set to about 30 kHz with respect to 640×480 lines, the same frequency as that in the conventional arrangement, by dividing one frame into the number of fields corresponding to the fundamental colors (three fields R, G, and B according to this method), by setting the field frequency to 60 Hz and by performing scanning by skipping two lines. In such a case, peripheral circuits for the gate drivers can be arranged like those in the conventional arrangement.

Separation of one pixel into the fundamental colors may be such that the pixel is divided into two colors, four colors, or the like. For adaptation to such separation, the number of scanning lines is doubled or quadrupled, and a lateral stripe pattern or a mosaic pattern similar to those described above may used for layout of color filter elements of two or four colors.

The methods of the present invention have been described with respect to VGA of 640×480 pixels. However, there are other various frame display modes. Needless to say, the arrangement of the present invention can be applied by being modified in accordance with various standards or systems, e.g., the NTSC system for television display using 480 scanning lines, the PAL system for television display using 570 scanning lines, the HDTV system using 1125 scanning lines, SVGA using 600 scanning lines, XGA using 768 scanning lines, EWS using 1024 scanning lines, etc.

A liquid crystal display may be arranged so that the non-interlaced drive system described above with reference to FIG. 12 and the interlaced drive system described above with reference to FIG. 13 can be used by being switched. For example, if the liquid crystal display is used for a personal computer, the display and the computer may be arranged in such a manner that a switch for changing the systems is provided in the vicinity of the display combined with the personal computer, and the drive circuits for the non-interlaced drive system described above with reference to FIG. 12 and the interlaced drive system described above with reference to FIG. 13 are changed by operating the switch, thereby enabling the display mode of the display device to be changed according to use purposes.

The technical scope of the present invention is not limited to the above-described embodiments and the present invention can be modified in various ways without departing from the gist thereof. The materials of the layers forming the thin-film transistor substrate, the aspect ratio of dots, the aperture ratio, the configuration of the drivers described above with respect to the drive method, and so on have been described only by way of example. Needless to say, these and other components or factors can be changed as desired.

As described above in detail, in the active matrix type liquid crystal display of the present invention, the width of each pixel electrode along the scanning line direction is set larger relative to the width along the signal line direction. Therefore, even if the display is designed so that the capacitance value of the storage capacitance cells is the same as that in the conventional structure, the light stop area can be reduced relative to that in the conventional display to increase the aperture ratio. If the same aperture ratio as that in the conventional display suffices, the storage capacitance value can be increased to reduce flicker and crosstalk due to off current in the switching elements.

If the conductor layer connected to each pixel electrode and the corresponding scanning line form a storage capacitance cell, the area of the storage capacitance cell can be reduced while the necessary capacitance value of the storage capacitor is maintained, thereby further increasing the aperture ratio. If the conductor layer is a layer corresponding to the source electrode and the drain electrode, the above-described storage capacitance cell can be obtained without specially increasing the number of layers.

In the case where the liquid crystal display of the present invention is arranged for multicolor display, a set of color filter elements respectively having different fundamental colors may be iteratively arranged as an iteration unit along each scanning line, the number of scanning lines being set to the number obtained by multiplying the total number of pixels along the signal line direction by the number of fundamental colors. In this manner, the number of source drivers employed can be reduced in comparison with that in the conventional arrangement to reduce the power consumption and the manufacturing cost and to increase the yield.

A layout of the colors may be selected such that filter elements having one of the fundamental colors are arranged along each scanning line. In a case where a digital image is processed by signal processing with a personal computer, particularly in a case where error diffusion processing based on calculating a correlation between adjacent pixels is performed, the image processing can be facilitated by using such a color layout because signals of dots adjacent to each other in the horizontal direction are the same. Advantageously, in such a case, an effect of limiting memory consumption can be expected. Another color layout may be selected such that the colors of each adjacent pair of filter elements arranged along each scanning line are different from each other. In such a case, an image such as a landscape can be displayed without lateral stripe noise, and can be formed more naturally and smoothly.

What is claimed is:

1. An active matrix type liquid crystal display comprising:
    a matrix of a plurality of scanning lines and a plurality of signal lines arranged on a surface of one of a pair of substrates between which a liquid crystal is interposed; and
    a plurality of switching elements and a plurality of dots, each switching element and dot having a pixel electrode provided in each of regions surrounded by adjacent signal lines and adjacent scanning lines, said switching element being connected with one of the adjacent scanning lines and one of the adjacent signal lines, said pixel electrode being connected with said switching element,
    wherein:
    the width of said pixel electrode in the direction along the scanning lines is three times as large as the width of said pixel electrode in the direction along the signal lines, and
    said pixel electrode extends over a portion of the other of the adjacent scanning lines, said pixel electrode forming a storage capacitance cell in association with the other scanning line with an insulating film interposed between the pixel electrode and the other scanning line.

2. An active matrix type liquid crystal display according to claim 1, wherein one pixel is formed of a red dot, a green dot, and a blue clot, the dots forming the pixel being arranged in order of red, green, and blue along the signal lines.

3. An active matrix type liquid crystal display according to claim 2, wherein the order of the fundamental colors iteratively arranged along each of the signal lines is fixed with respect to the progress of iteration along the signal line, and the same fundamental color is arranged along each of the scanning lines.

4. An active matrix type liquid crystal display according to claim 2, wherein the order of the fundamental colors iteratively arranged along each of the signal lines is fixed with respect to the progress of iteration along the signal line, each of the fundamental colors being arranged obliquely with respect to the scanning lines, each adjacent paid of the fundamental colors along each of the scanning lines being different from each other.

5. An active matrix type liquid crystal display according to claim 1, wherein a drain electrode connects the pixel electrode with the switching element, a connection between the drain electrode and pixel electrode is disposed entirely in the region surrounded by the adjacent signal lines and the adjacent scanning lines and does not vertically overlap either adjacent scanning line.

6. An active matrix type liquid crystal display according to claim 1, wherein a drain electrode connects the pixel electrode with the switching element and a connection between the drain electrode and pixel electrode is formed above the switching element.

7. An active matrix type liquid crystal display according to claim 1, wherein a drain electrode connects the pixel electrode with the switching element and a connection between the drain electrode and pixel electrode is entirely disposed above the other of the adjacent scanning lines.

8. An active matrix type liquid crystal display comprising:

a matrix of a plurality of scanning lines and a plurality of signal lines a a surface of one of a pair of substrates between which a liquid crystal is interposed; and a plurality of switching elements and a plurality of dots, each switching element and dot having a pixel electrode provided in each of regions surrounded by adjacent signal lines and adjacent scanning lines, said switching element being connected with one of the adjacent scanning lines and one of the adjacent signal lines, said pixel electrode being connected with said switching element.

wherein:

the width of said pixel electrode in the direction along the scanning lines is three times as large as the width of said pixel electrode in the direction along the signal lines, and a conductor layer connected to said pixel electrode and formed over a portion of the other of the adjacent scanning lines forms a storage capacitance cell in association with the other scanning line with an insulating film interposed between the conductor layer and the other scanning line.

9. An active matrix type liquid crystal display according to claim 8, wherein one pixel is formed of a red dot, a green dot, and a blue dot, the dots forming the pixel being arranged in order of red, green, and blue along the signal lines.

10. An active matrix type liquid crystal display according to claim 9, wherein the order of the fundamental colors iteratively arranged along each of the signal lines is fixed with respect to the progress of iteration along the signal line, and the same fundamental color is arranged along each of the scanning lines.

11. An active matrix type liquid crystal display according to claim 9, wherein the order of the fundamental colors iteratively arranged along each of the signal lines is fixed with respect to the progress of iteration along the signal line, each of the fundamental colors being arranged obliquely with respect to the scanning lines, each adjacent paid of the fundamental colors along each of the scanning lines being different from each other.

12. An active matrix type liquid crystal display according to claim 8, wherein a drain electrode connects the pixel electrode with the switching element, a connection between the drain electrode and pixel electrode is disposed entirely in the region surrounded by the adjacent signal lines and the adjacent scanning lines and does not vertically overlap either adjacent scanning line.

13. An active matrix type liquid crystal display according to claim 8, wherein a connection between the conductor layer and the pixel electrode is entirely disposed above the other of the adjacent scanning lines.

14. An active matrix type liquid crystal display according to claim 8, wherein a width of the conductor layer is larger than a width of the scanning lines.

15. An active matrix type liquid crystal display according to claim 8, wherein a drain electrode connects the pixel electrode with the switching element and a connection between the drain electrode and pixel electrode is formed above the switching element.

16. An active matrix type liquid crystal display according to claim 15, wherein a connection between the conductor layer and the pixel electrode is entirely disposed above the other of the adjacent scanning lines.

17. An active matrix type liquid crystal display according to claim 8, wherein an extension of the conductor layer forms a drain electrode that connects the pixel electrode with the switching element.

18. An active matrix type liquid crystal display according to claim 17, wherein a connection between the conductor layer and pixel electrode is disposed entirely above the other of the adjacent scanning lines.

19. An active matrix type liquid crystal display according to claim 17, wherein a connection between the conductor layer and pixel electrode is disposed entirely in the region surrounded by the adjacent signal lines and the adjacent scanning lines and does not vertically overlap either adjacent scanning line.

20. An active matrix type liquid crystal display according to claim 8, wherein the switching element comprises a thin-film transistor, and the conductor layer is formed of the same layer as a source electrode and drain electrode of the thin-film transistor.

* * * * *

UNITED STATES PATENT AND TRADEMARK OFFICE
CERTIFICATE OF CORRECTION

PATENT NO.     : 6,249,326 B1
DATED          : June 19, 2001
INVENTOR(S)    : Hiroyuki Hebiguchi It is certified that error appears in the above-identified patent and that said Letters Patent is hereby corrected as shown below:

<u>Column 18,</u>
Line 48, delete "blue clot" and substitute -- blue dot -- in its place.

<u>Column 19,</u>
Line 18, delete "a a surface" and substitute -- arranged on a surface -- in its place.
Line 27, immediately after "switching element" delete "." (period) and substitute -- , -- (comma) in its place.

Signed and Sealed this

Twenty-seventh Day of July, 2004

JON W. DUDAS
*Acting Director of the United States Patent and Trademark Office*